(12) United States Patent
May et al.

(10) Patent No.: US 9,974,008 B2
(45) Date of Patent: May 15, 2018

(54) ELEMENT-CENTRIC COMMUNICATION MAP

(71) Applicant: The United States of America, as represented by the Secretary of the Army, Washington, DC (US)

(72) Inventors: Bryan May, Baltimore, MD (US); Robert Shields, Phoenix, MD (US); Jeffrey Boksiner, Cockeysville, MD (US); Glenn Minko, Aberdeen, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days. days.

(21) Appl. No.: 15/080,721

(22) Filed: Mar. 25, 2016

(65) Prior Publication Data
US 2017/0280333 A1 Sep. 28, 2017

(51) Int. Cl.
*H04W 48/16* (2009.01)
*H04W 16/22* (2009.01)
*H04W 24/04* (2009.01)

(52) U.S. Cl.
CPC ........... *H04W 48/16* (2013.01); *H04W 16/22* (2013.01); *H04W 24/04* (2013.01)

(58) Field of Classification Search
CPC ....... H04W 4/02; H04W 16/18; H04W 4/021; H04W 24/02; H04W 4/08; H04W 4/025; H04W 64/006; H04W 48/16; H04W 4/028; H04W 76/023; H04L 41/22; H04L 41/12; G01C 21/00; G01C 21/16; G01C 21/34

See application file for complete search history.

(56) References Cited

U.S. PATENT DOCUMENTS

| | | | | |
|---|---|---|---|---|
| 2008/0132241 A1* | 6/2008 | Hancock | ............... | H04W 28/26 455/450 |
| 2009/0051702 A1* | 2/2009 | Morbey | ................. | G09B 29/10 345/629 |
| 2009/0191892 A1* | 7/2009 | Kelley | ................. | H04W 48/20 455/456.1 |
| 2012/0008526 A1* | 1/2012 | Borghei | ................ | H04W 4/021 370/254 |
| 2013/0326425 A1* | 12/2013 | Forstall | ............. | G01O 21/3638 715/851 |
| 2014/0114564 A1* | 4/2014 | Callaghan | ............... | G01O 21/20 701/416 |
| 2014/0355476 A1* | 12/2014 | Anderson | ............. | H04W 24/02 370/254 |
| 2015/0188800 A1* | 7/2015 | MacDonald | .......... | H04W 16/18 709/224 |
| 2015/0227999 A1* | 8/2015 | Maguire | ................ | G06Q 50/01 705/80 |

* cited by examiner

*Primary Examiner* — Ernest Tacsik
(74) *Attorney, Agent, or Firm* — Ronald Krosky; Azza Jayaprakash

(57) ABSTRACT

Various embodiments are described that relate to a visualization. A visualization can be produced that relates to a coverage area for an element in the network. A user of this element can read the visualization and make decisions in view of the coverage area. In one instance, the user can read the visualization and select a route of travel such that a likelihood of coverage being lost during travel is relatively small.

15 Claims, 21 Drawing Sheets

ND NETWORK NODES 47 (OK)

ELEMENT-CENTRIC COMMUNICATION MAP

GOVERNMENT INTEREST

The innovation described herein may be manufactured, used, imported, sold, and licensed by or for the Government of the United States of America without the payment of any royalty thereon or therefor.

BACKGROUND

In a communications environment, various elements can communicate with one another. In one example, an element can join a network and therefore communicate with other elements of the network. However, if the element leaves the network, then the element can lose communication with the other elements of the network. Therefore, it can be desirable for the element to remain part of the network.

SUMMARY

In one embodiment, a system comprises a determination component and a visualization component. The determination component can be configured to make a determination on an available communication area for a communication element provided by a communication partner group of the communication element. The visualization component can be configured to produce a visualization that illustrates the communication area and that is configured for presentation upon a display. The determination component, the visualization component, or a combination thereof can be implemented, at least in part, by way of non-software.

In one embodiment, a method comprises obtaining a coverage area for a network comprising the mobile communication element. Additionally, the method comprises identifying a coverage area of the mobile communication element. Also, the method comprises subtracting the coverage area of the mobile communication element from the coverage area of the network to produce a resultant area. In addition, the method comprises causing information related to the resultant area to be presented.

In one embodiment, a method comprises creating a coverage map for a network, the network comprising a first mobile network node and a second mobile network node. The method also comprises transmitting the coverage map to the first mobile network node and transmitting the coverage map to the second mobile network node. The first mobile network node creates a first mobile network node centric map based, at least in part, on the coverage map and the second mobile network node creates a second mobile network node centric map based, at least in part, on the coverage map. The first mobile network node centric map is displayed on a first display associated with the first mobile network node and the second mobile network node centric map is displayed on a second display associated with the second mobile network node. The first mobile network node and the second mobile network node are configured to communicate with one another.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

FIG. 2A illustrates one embodiment of a system comprising a coverage component, an element component, the determination component, and the visualization component, while

FIG. 4A illustrates one embodiment of a system comprising a gap component, a location component, an instruction component, the determination component, and the visualization component, while

FIG. 5A illustrates one embodiment of a system comprising the determination component, the visualization component, a reliance component, and a dependency component, while

FIG. 6A illustrates one embodiment of a system comprising the determination component, the visualization component, an analysis component, and a route component, while

Figure 1A:
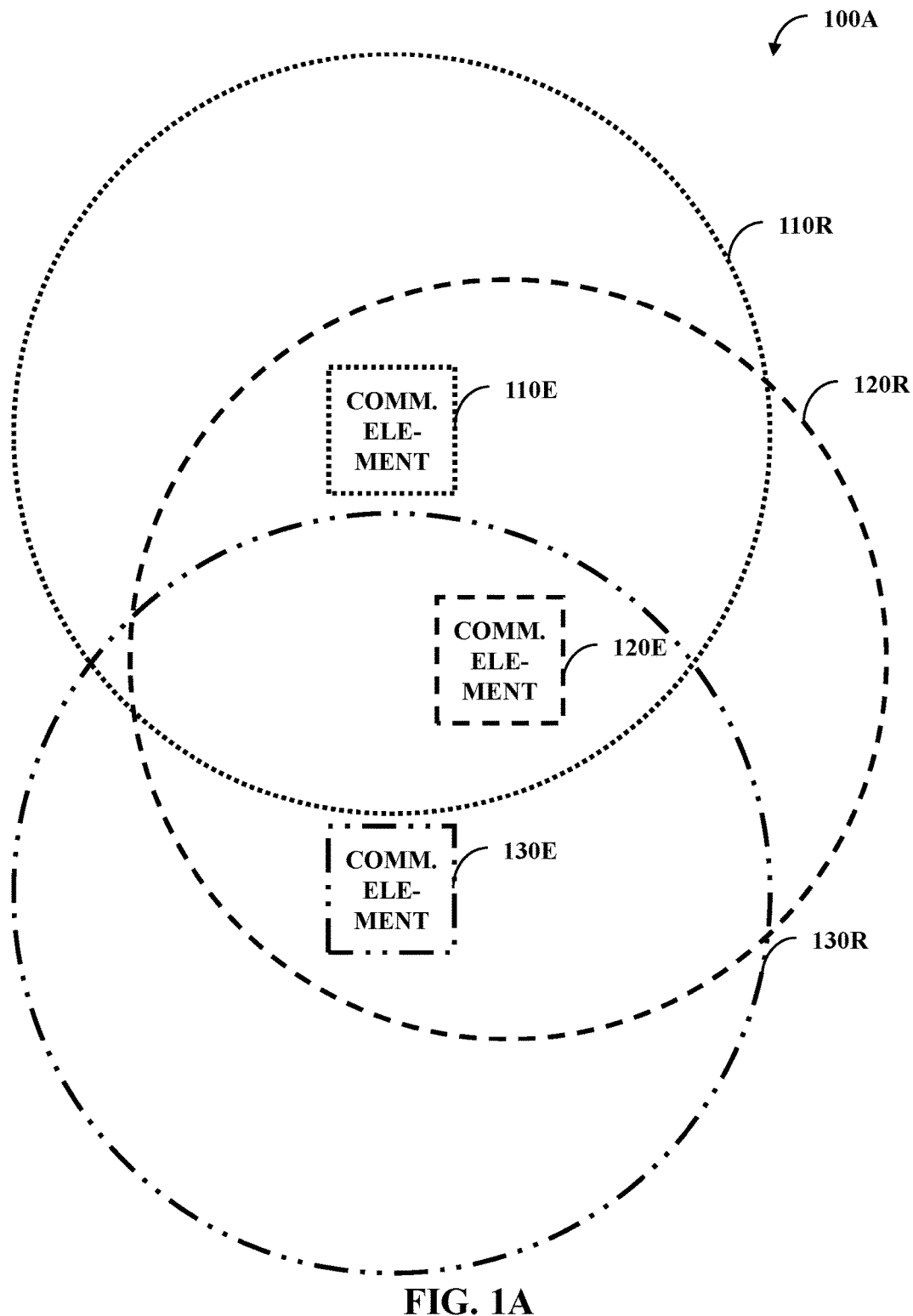
FIG. 1A illustrates one embodiment of an environment.

Reference to these drawings elsewhere in the text can be summarized for ease in readability. In one example, when discussing FIG. 3 such as when referring back to something illustrated in FIG. 1E, FIG. 1E can be addressed as "FIG. 1." Similarly, when an aspect is addressed in multiple drawings with a common base number, such as a common aspect in FIGS. 1C, 1D, and 1E, and referenced elsewhere, these can simply be addressed as "FIG. 1."

DETAILED DESCRIPTION

In one embodiment, a network can be formed, such as a mobile ad hoc network. This mobile ad hoc network can be a dynamic network where different elements enter and leave the network and therefore the overall coverage of the network changes. This change in coverage can relate to physical area covered, as well as other elements available for communication. Coverage can vary at any point in time as individual nodes move in this mobile network, thereby varying a strength of a radio transmission as measured at a point in space.

To give a user of the element a better understanding of the network as coverage changes, a visualization can be provided of network coverage. However, as being part of the network, the element itself can introduce its own coverage to the network. The visualization can be absent the coverage provided by the element, such that the visualization is focused on what other element members provide to the element.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 1B:
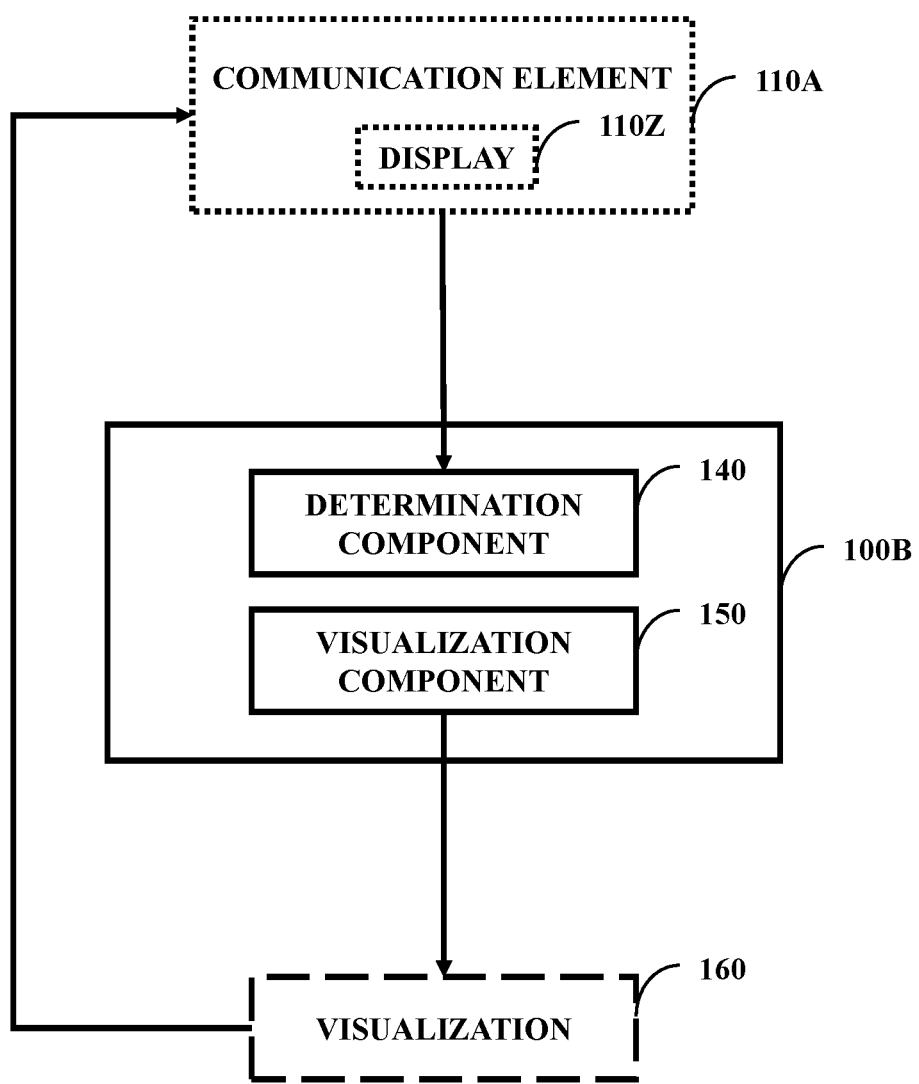
FIG. 1B illustrates one embodiment of a system comprising a determination component and a visualization component.

FIG. 1A illustrates one embodiment of an environment 100A, FIG. 1B illustrates one embodiment of a system 100B comprising a determination component 140 and a visualization component 150. The communication elements 110E-130E can each have a communication range 110R-130R and each of their own systems (e.g., each of the elements 110E-130E have its own determination component 140 and visualization component 150). The ranges 110R-130R allows for elements 110E-130E to communicate with one another.

In one example, the range 110R allows for element 110E to directly communicate with element 120E, but not directly with the element 130E. However, since the range 120R of element 120E covers element 110E and the range 130R of element 130E covers element 120E, element 110E can indirectly communicate with element 130E. As a manner of indirect communication, a data packet can be sent from 110E to 120E and then 120E can act as a relay and send the data packet to 130E. Since 110E-130E can communicate with one another, 110E-130E can be considered a network.

In one embodiment, the network can be a mobile ad hoc network. With this, the elements 110E-130E can be mobile units, such as radios, that move around during operation. This movement can cause different elements to enter and exit the network and thus available elements to communicate with can be ever-changing. Additionally, this movement can cause fluidity in the overall coverage area of the network (e.g., the combined range from ranges 110R-130R).

It can be beneficial for an element to be aware of the available network. The determination component 140 can be configured to make a determination on an available communication area (e.g., the combined range of 110R-130R or a range combination of 120R and 130R) for the communication element 110E provided by a communication partner group (in this example, elements 120E and 130E) of the element 110E. The visualization component 150 can be configured to produce a visualization 160 (e.g., the environment 100A as well as other environments disclosed herein) that illustrates the communication area. The visualization 160 can be presented upon a display.

The display can be a display of an element, such as display 110Z of element 110A (e.g., cellular telephone screen, dashboard display of an automobile, etc.), be a heads-up display (e.g., the visualization 160 is presented by way of glasses worn by an operator of the element 110A), etc. The visualization 160 can be centric to an element. In one example, the visualization 160 can be used by a user to determine where he (or she) can travel so they remain within the network or remain in communication with a particular device. With this, the user may not care about a contribution by his (or her) element to the network. Therefore, the visualization can be centric to an element.

Figure 1C:
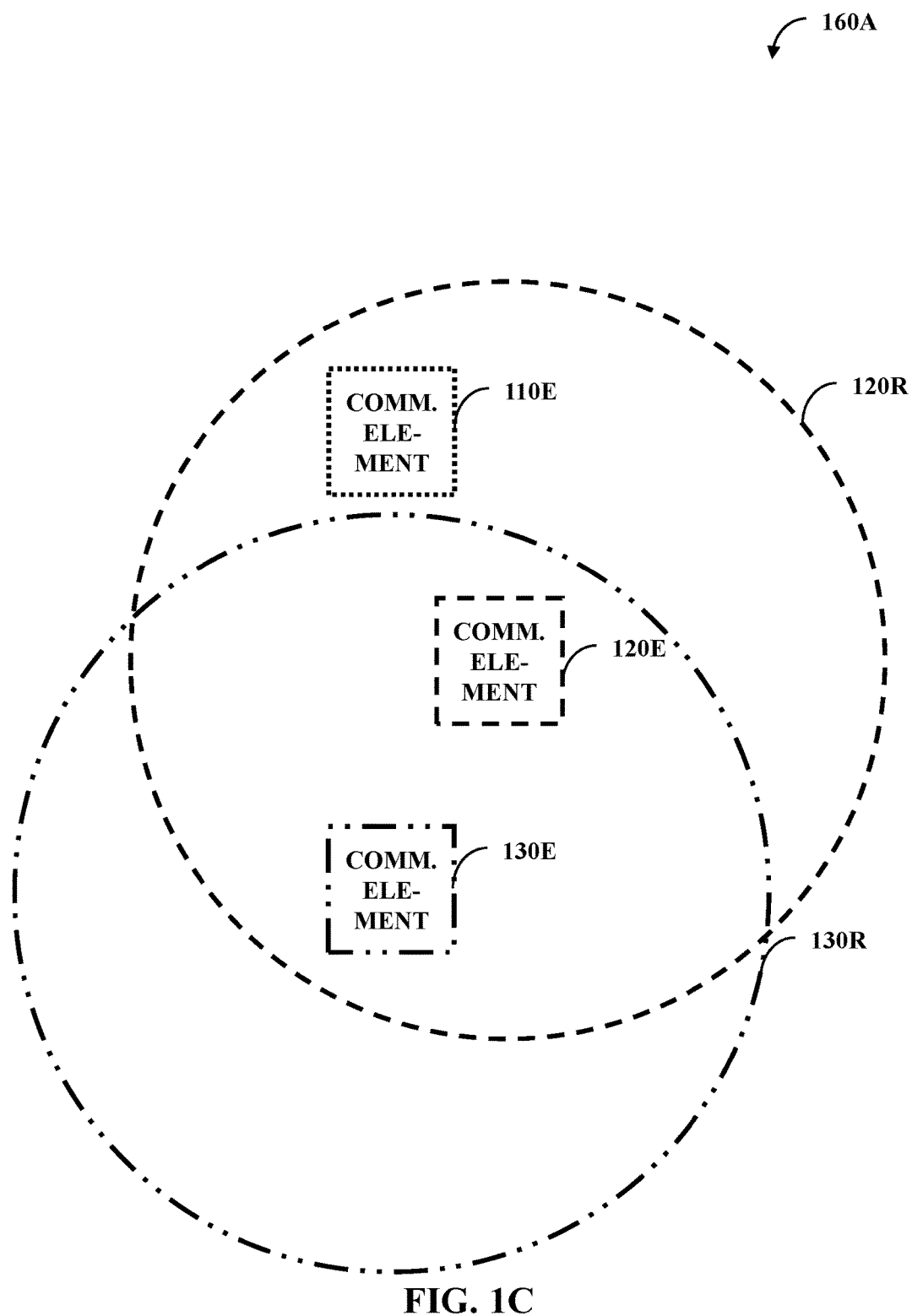
FIGS. 1C-1E illustrate three embodiments of a visualization.
Figure 1D:
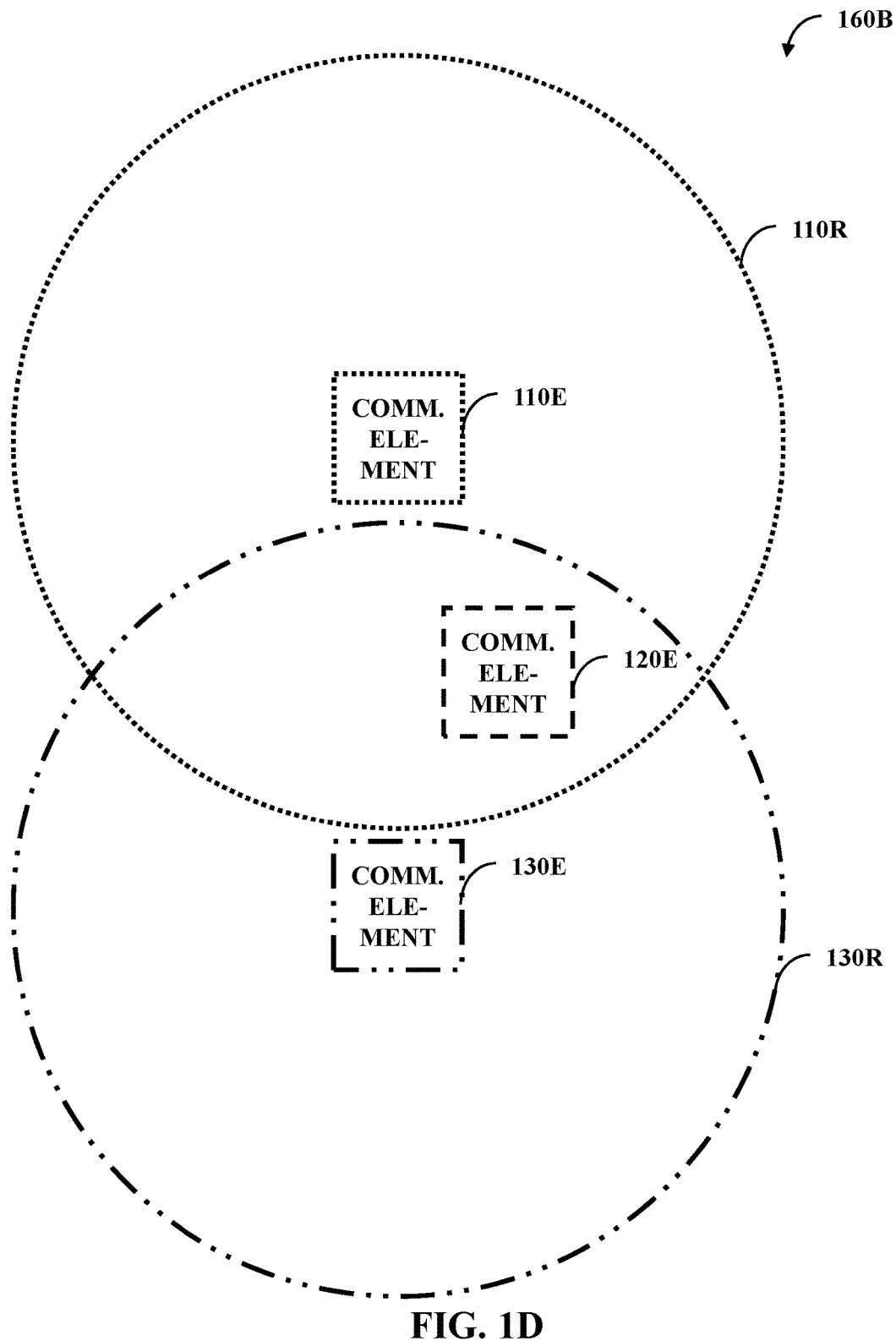
Figure 1E:
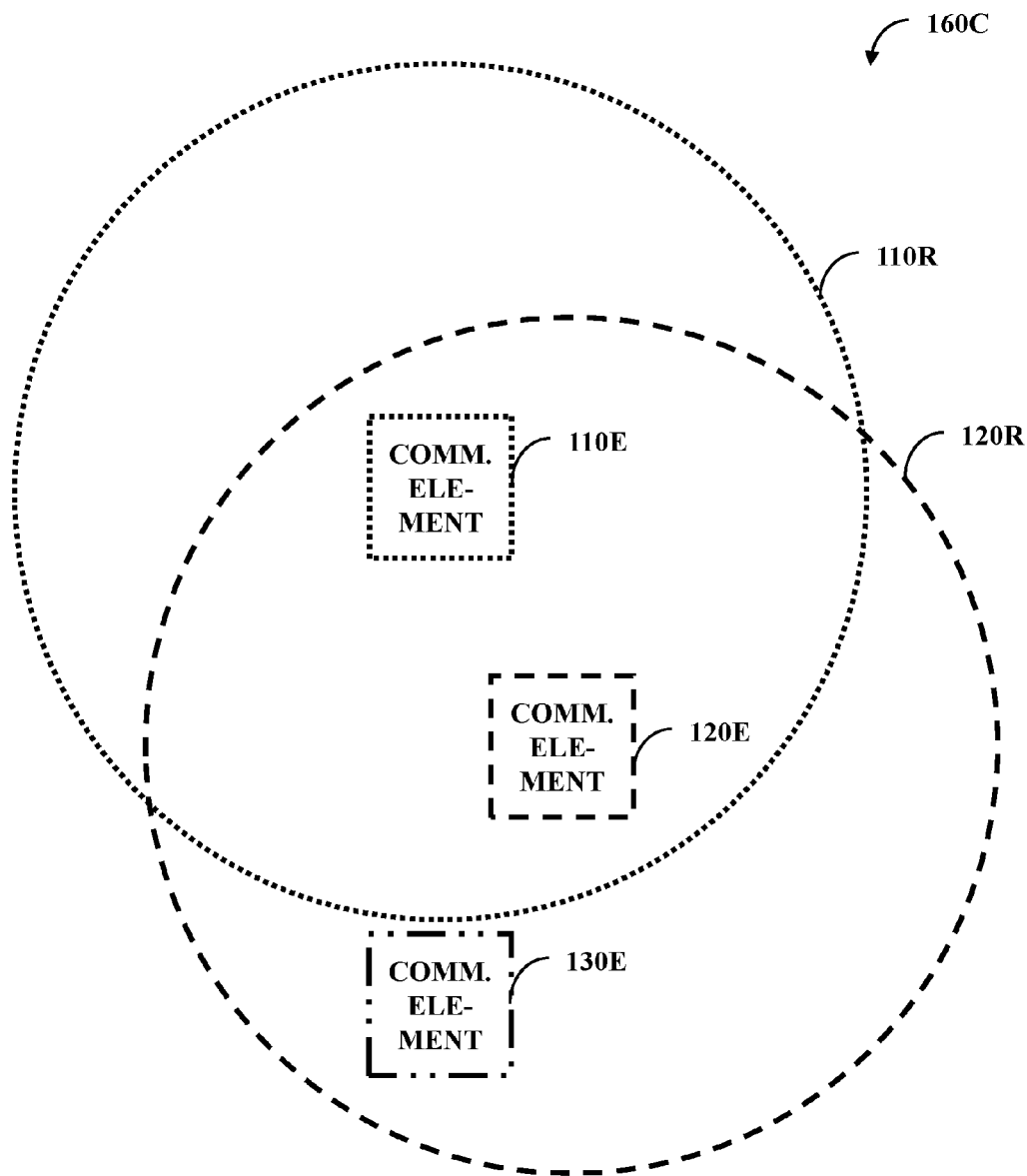

In one example, three different visualizations can be presented: visualization 160A of FIG. 1C for element 110E, visualization 160B of FIG. 1D for element 120E, and visualization 160C of FIG. 1E for element 130E (note that the visualizations 160A-160C can also be environments and the environment 100A can also be a visualization and the same is true for other environments disclosed herein). These different visualizations can be centric to their respective element. The elements 110E-130E can be associated with individual displays. These elements can have a partner group of other network members. With this, element 110E has a partner group of elements 120E and 130E, element 120E has a partner group of 110E and 130E, and element 130E has a partner group of 110E and 120E. The elements 110E, 120E, and 130E can have their own determination components 140 and visualization components 150 or a centralized location can produce the visualizations 160A-160C and transmit them to the respective elements 110E-130E for display upon a respective display or transmit them elsewhere.

The visualization component 150 can produce element-centric visualizations that do not illustrate offerings of the particular element. In one example, the visualization 160A does not illustrate the range 110R. Therefore, the element 110E illustrates offerings of its partner group, but not its own offering.

While illustrated as relatively basic visualizations, the visualizations 160A-160C can provide other information. In one example, positional information can be disclosed for elements—either the element of the visualization or of the partner group for that element. Examples of positional information can be coordinates, elevation, or travel direction. In one example, the visualizations 160A-160C can be used for search and rescue purposes.

Figure 1F:
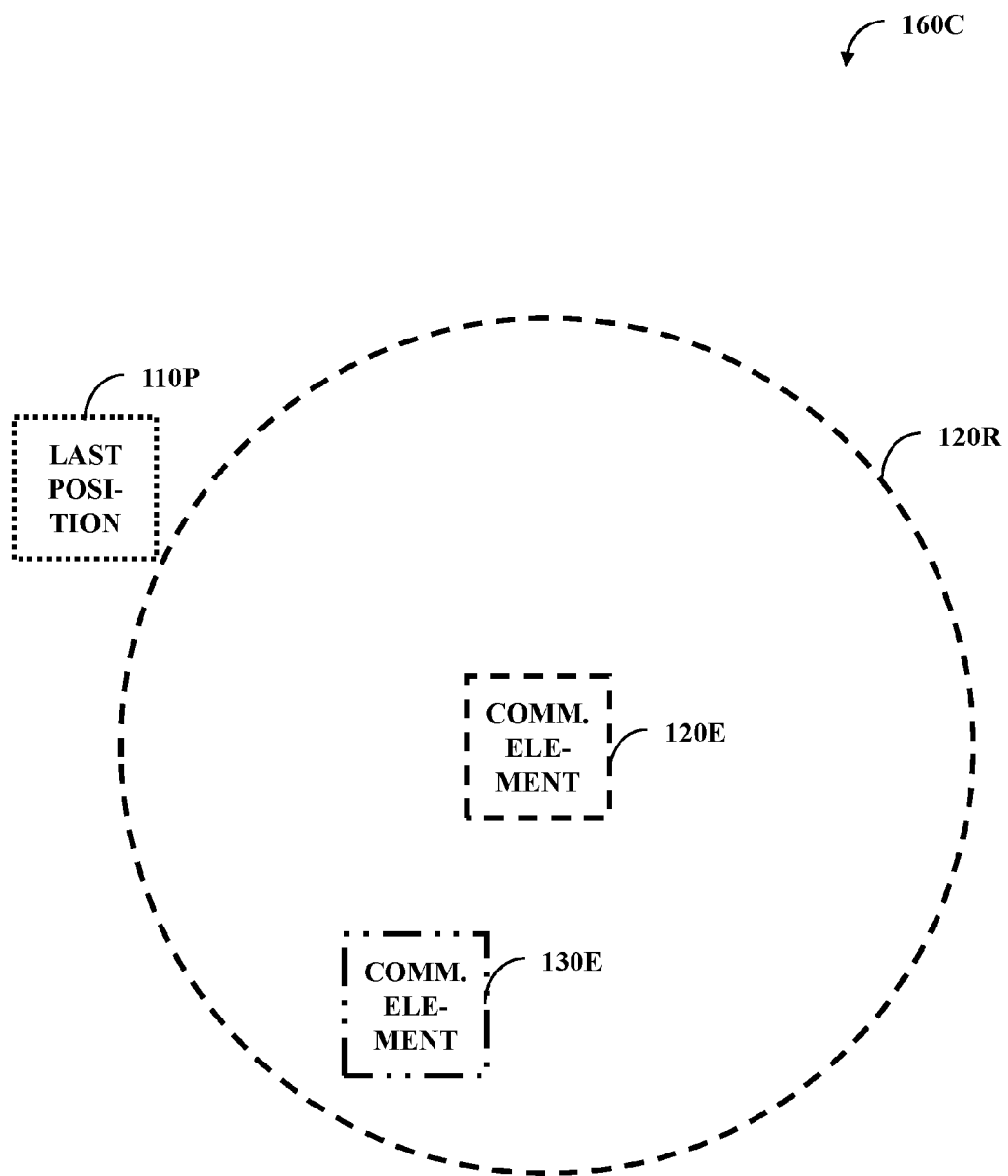
FIG. 1F illustrates one embodiment of a visualization with updated information.

FIG. 1F illustrates one embodiment of the visualization 160C in with updated information—with this updated information a search and rescue can occur. The elements 110E-130E can move to the right and this movement can be represented in the visualizations 160A-160C (e.g., movement of the elements 110E-130E and the respective ranges 110R-130R). The user of element 110E can become injured and therefore stop moving while elements 120E and 130E continue moving. Eventually, element 110E is out communication. The visualization 160C in FIG. 1F illustrates the loss of range 110R due to element 110E being out of communication. The visualization 160C of FIG. 1F can illustrate a last position 110P of the element 110E. With this information, element 130E can attempt to try to find element 110E while staying within the coverage area that is now just range 120R. In addition, move complex efforts can be made, such as directing concurrent movement of elements 120E and 130E (e.g., from a management component) toward the last position 110P so as to locate element 110E.

In some instances, the last position 110P can be vital information while in other instances the last position 110P can be more helpful that harmful. In one instance, if a soldier is wounded, then the last position 110P can be a lifesaving piece of information so fellow soldiers can locate that injured soldier. However, if element 110E simply left the network by choice of its user, then the last position 110P can serve as a visual distraction. In one embodiment, the user of element 110E can activate a distress signal and upon receiving the distress signal the last position 110P can be displayed in the visualization 160C of FIG. 1F. In addition to the distress signal, other information can be provided and indicated on the visualization, such as why the element 110E stopped moved (e.g., twisted ankle of user), warning information (e.g., location of enemy shooter), or other information (e.g., notice of mechanical failure of element 110E).

Figure 2A:
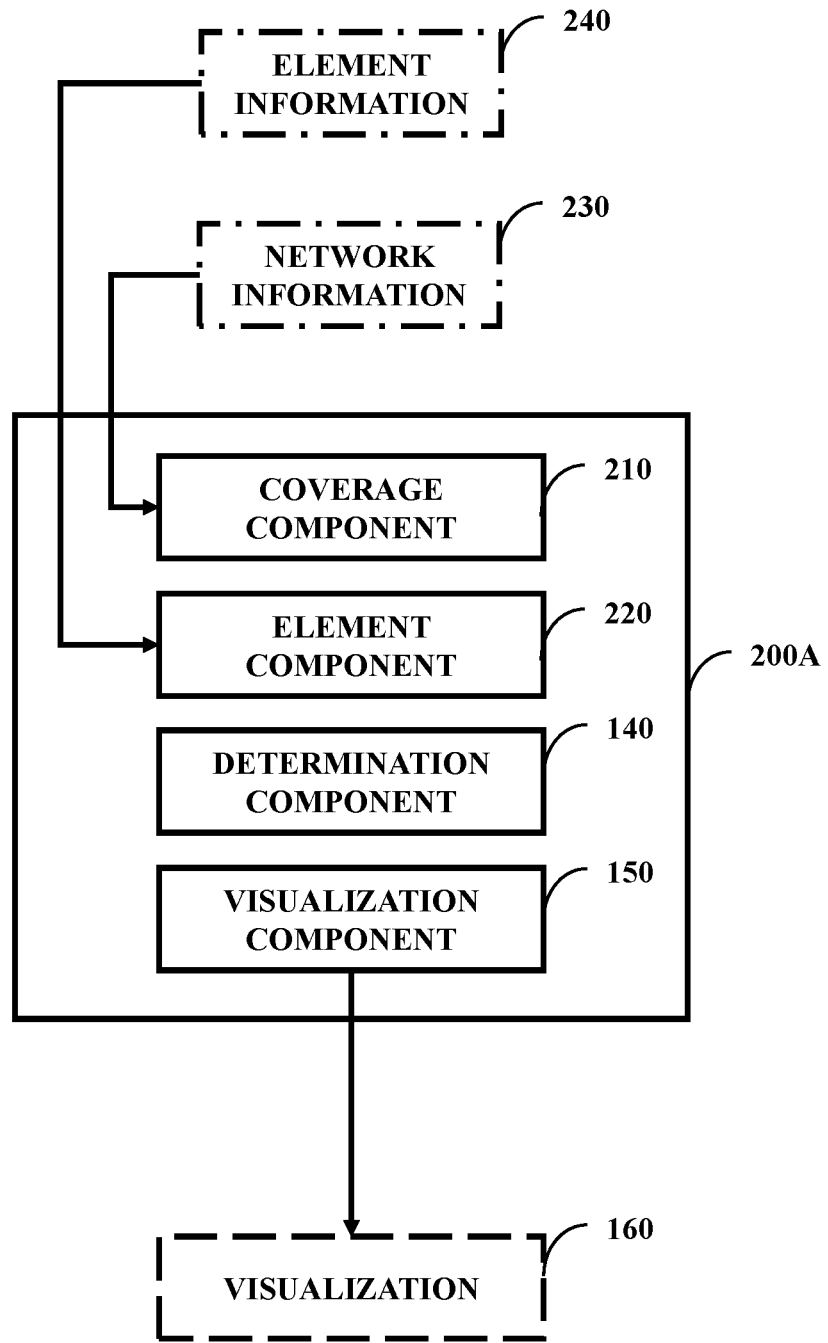

FIG. 2A illustrates one embodiment of a system 200A comprising a coverage component 210, an element component 220, the determination component 140, and the visualization component 150. The coverage component 210 can be configured to identify an overall communication area (e.g., from a set of network information 230), such as adding together the ranges 110E-130E of FIG. 1. The element component 220 can be configured to determine a communication area of a particular element (e.g., from a set of element information 240). The determination component 140 can be configured to make the determination by ignoring the communication area of the communication element from the overall communication area.

Figure 2B:
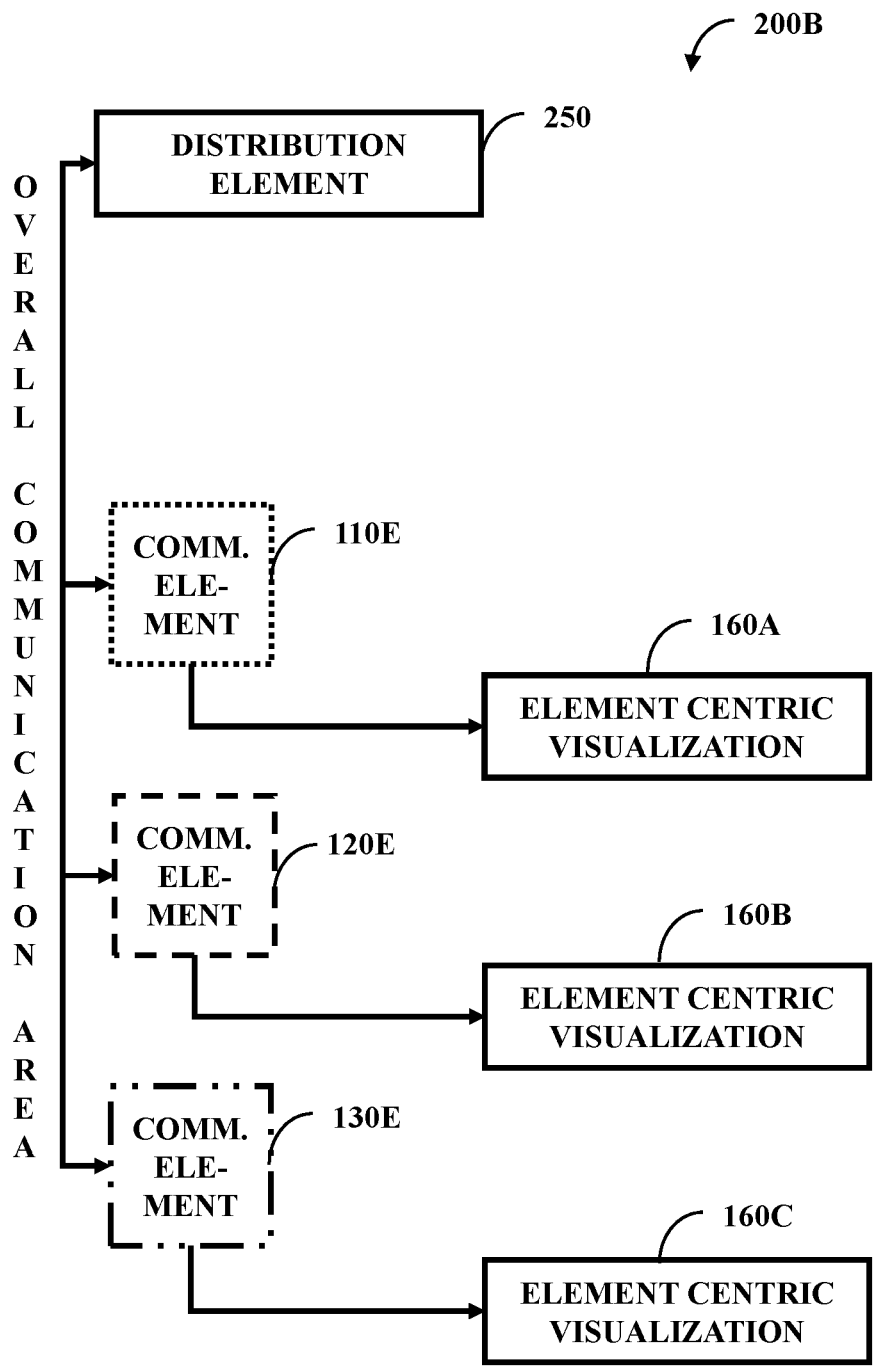
FIG. 2B illustrates one embodiment of an environment with a distribution element and multiple communication elements.

FIG. 2B illustrates one embodiment of an environment 200B with a distribution element and multiple communication elements 110E, 120E, and 130E. Here, distribution element 250 can communicate with the elements 110E-130E. The elements 110E-130E can send information about their ranges 110R-130R to the distribution element 250. From this, the distribution element 250 can ascertain the overall communication area (e.g., the sum of ranges 110R-130R). The overall communication area can be transmitted to the elements 110E-130E where the overall communication area is identified by the individual elements 110E-130E (e.g., their individual coverage components 210 read the overall coverage area as the identification) after being received. The distribution element 250 can be a central processing unit, such as a server or hub, or the distribution element 250 can be a communication element such as elements 110E-130E with an additional task of those performed by the distribution element 250.

In one example, element 110E can take the overall communication area, once identified, and remove its contribution from the overall communication area. The remainder after removal can be the available communication area. This available communication area can be represented in the visualization 160A that is element centric for element 110E.

In one embodiment, the elements 110E-130E can develop the overall communication area absent the distribution element 250. In one example, the elements 110E-130E can send information pertaining to their ranges 110R-130R of FIG. 1 to the other elements (e.g., element 110E sends information about the range 110R of FIG. 1 to elements 120E and 130E). With this sharing of information, individual coverage components 210 of the elements 110E-130E can individually develop and identify the overall communication area. Once identified, the element 110E can transfer information about the overall communication area to the elements 120E and 130E for verification purposes, for the elements 120E and 130E to use as the overall communication area (e.g., to save processing time for the elements 120E and 130E to create their own overall communication area), etc.

Figure 3:
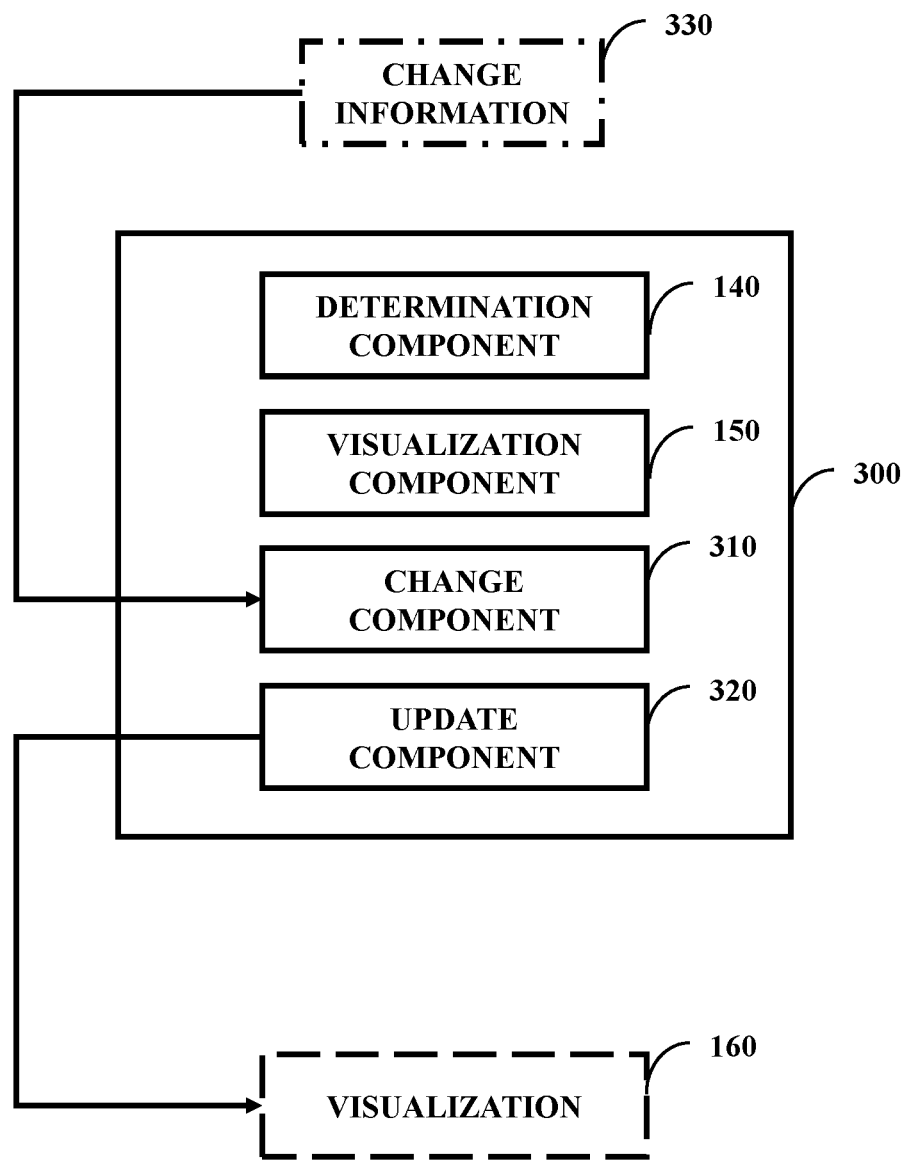
FIG. 3 illustrates one embodiment of a system comprising the determination component, the visualization component, a change component, and an update component.

FIG. 3 illustrates one embodiment of a system 300 comprising the determination component 140, the visualization component 150, a change component 310, and an update component 320. The change component 310 can be configured to identify a change (e.g., derived for a set of change information 330) to the network and therefore to the communication partner group of an element of the network. An example of the change can be a net change in a total number of the communication partner group or movement of an element that changes the overall communication area. The update component 320 can be configured to update the visualization 160 to reflect the change.

In one example, the element 130E of FIG. 1 can physically move lower or have a decrease in its range 130R (e.g., due to conserving battery power). Since element 130E of FIG. 1 is in the partner group of 110E and the partner group of 120E, this change influences their available communication area. In response to this change, the visualization 160A of FIG. 1 and the visualization 160B of FIG. 1 can be changed.

Figure 4A:
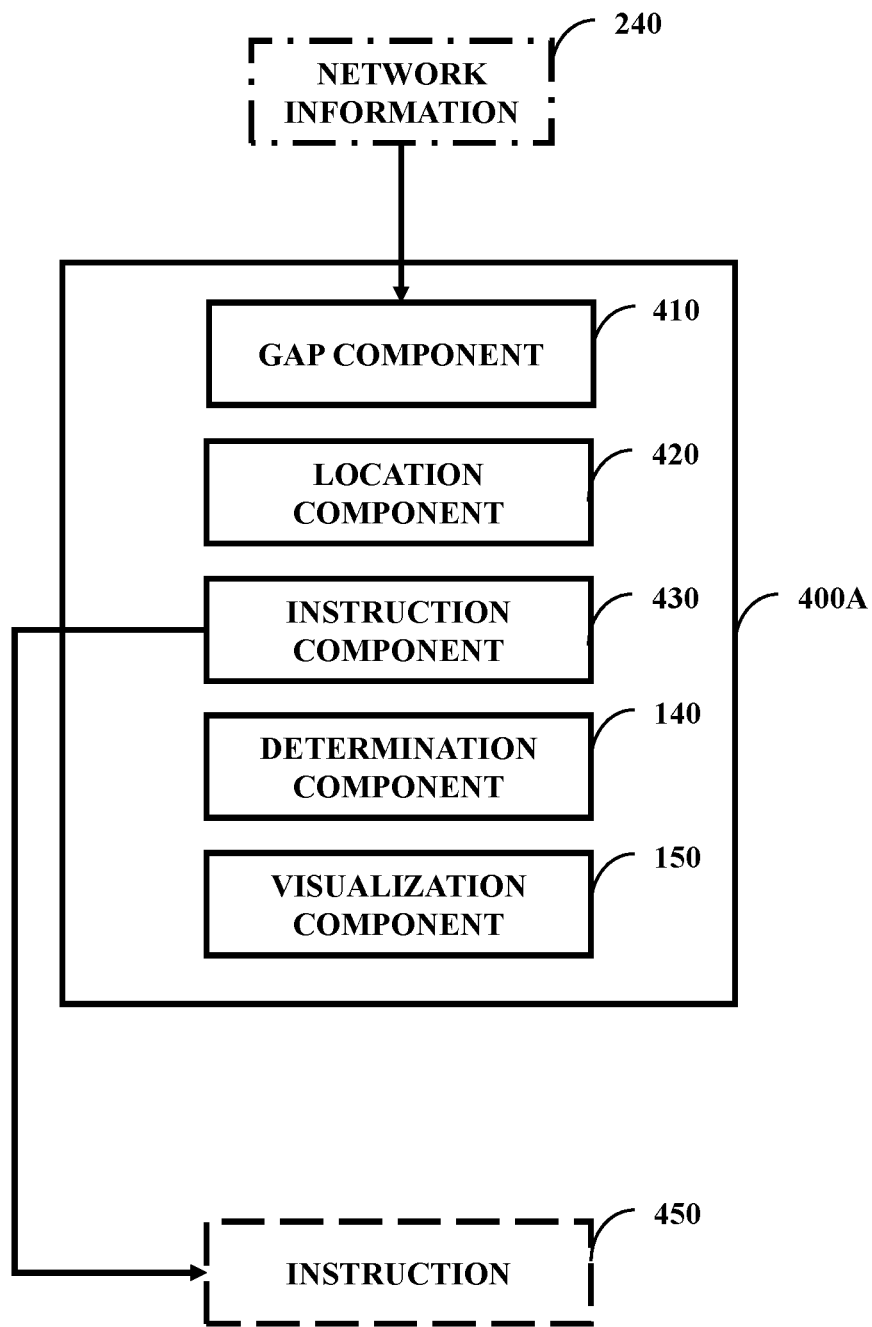
Figure 4B:
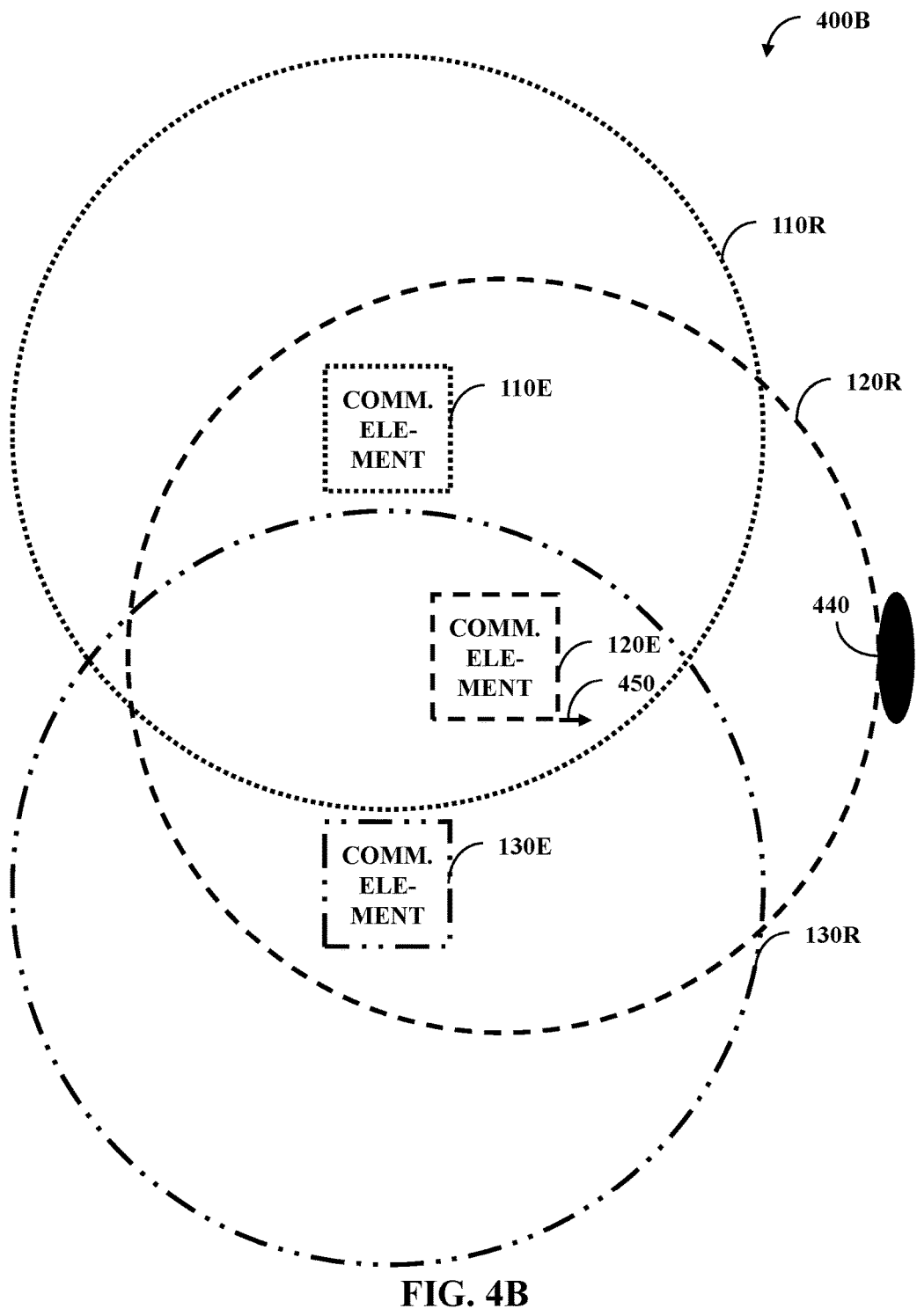
FIG. 4B illustrates one embodiment of a communications environment with a gap.

FIG. 4A illustrates one embodiment of a system 400A comprising a gap component 410, a location component 420, an instruction component 430, the determination component 140, and the visualization component 150, while FIG. 4B illustrates one embodiment of a communications environment 400B with a gap 440. The gap component 410 can be configured to identify the gap 440 in the available communication area for the element 110E. The location component 420 can be configured to make a determination of a location for the element 120E to mitigate the gap 440. The instruction component 430 can be configured to create an instruction 450 (e.g., an instruction to move to the location) that is disclosed to the element 120E.

In one example, the elements 110E-130E can be radios operated by members of a military team (e.g., fire team). One of the objectives of the team can be to provide a vast amount of combined coverage by way of their combined ranges 110R-130R. This combined coverage can be used by members of other military teams. A scout, that is not part of the team and has his own radio, can be employed to check an area surrounding the team for security purposes. For this reason, it can be beneficial that a maximum area be scouted.

Therefore, it can be beneficial that the combined coverage be as large as possible. With this, the system 400A can function to increase (e.g., maximize) the combined coverage area. The system 400A can identify that the element 120E can move to the right in FIG. 4B to increase the coverage area to include the gap 440. In turn, the system 400A can produce the instruction 450 indicating such a move.

In one example, the system 400A functions to manage multiple mobile ad hoc networks. With this example, another element that is part of another mobile ad hot network can reside in the gap 440. From an overall management standpoint, it can be desirable for there to be fewer networks to manage and for the networks that do exist to be as robust as possible (e.g., have as many communication partners as possible). Therefore, the system 400A can conclude that by moving the element 120E such that its range 120R covers the gap 440, the two networks can become one. In view of this, the instruction component 430 can produce multiple instructions 450—one to the element 120E to move and one for the element in the gap 440 to not move. The system 400A can comprise logic to determine how to instruct, such as determining which element should move and which should say, how both elements should move, etc.

Figure 5A:
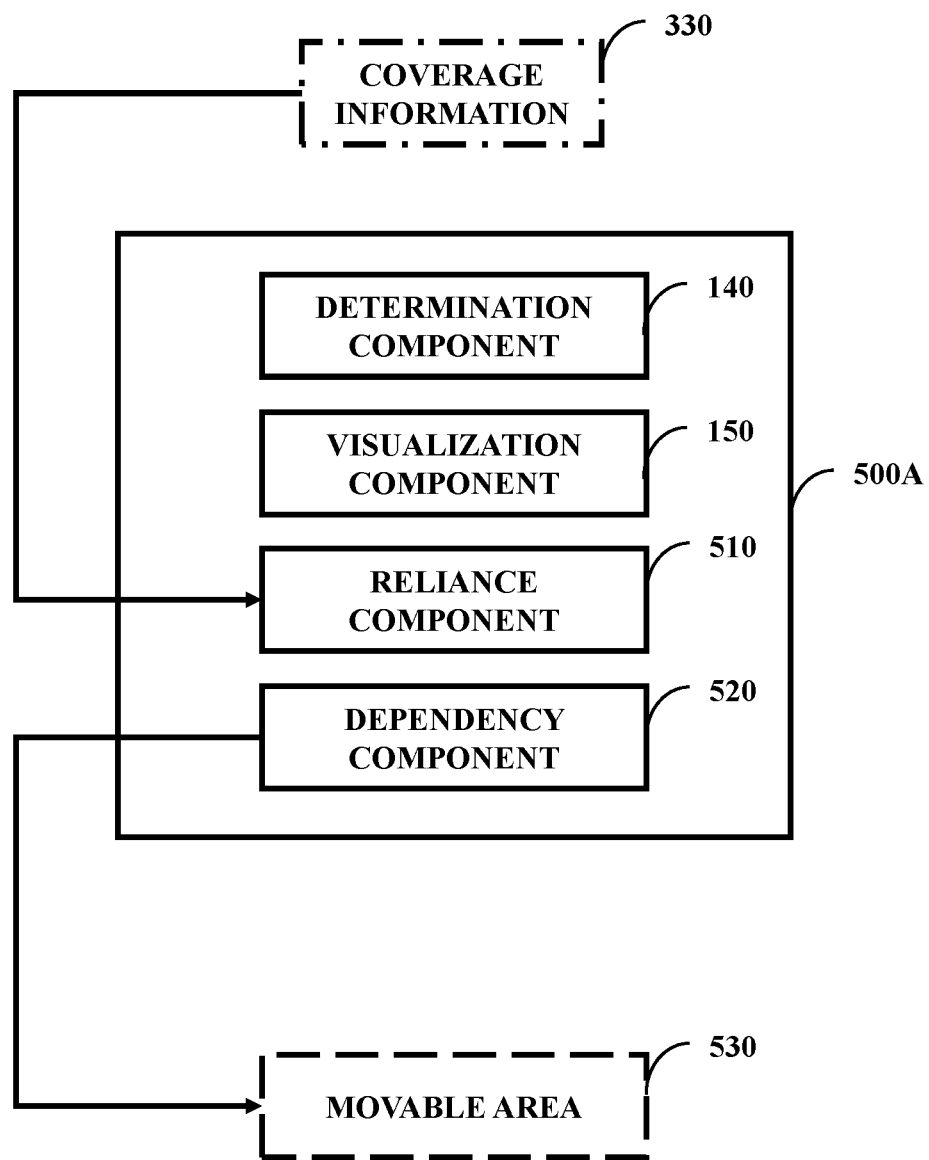
Figure 5B:
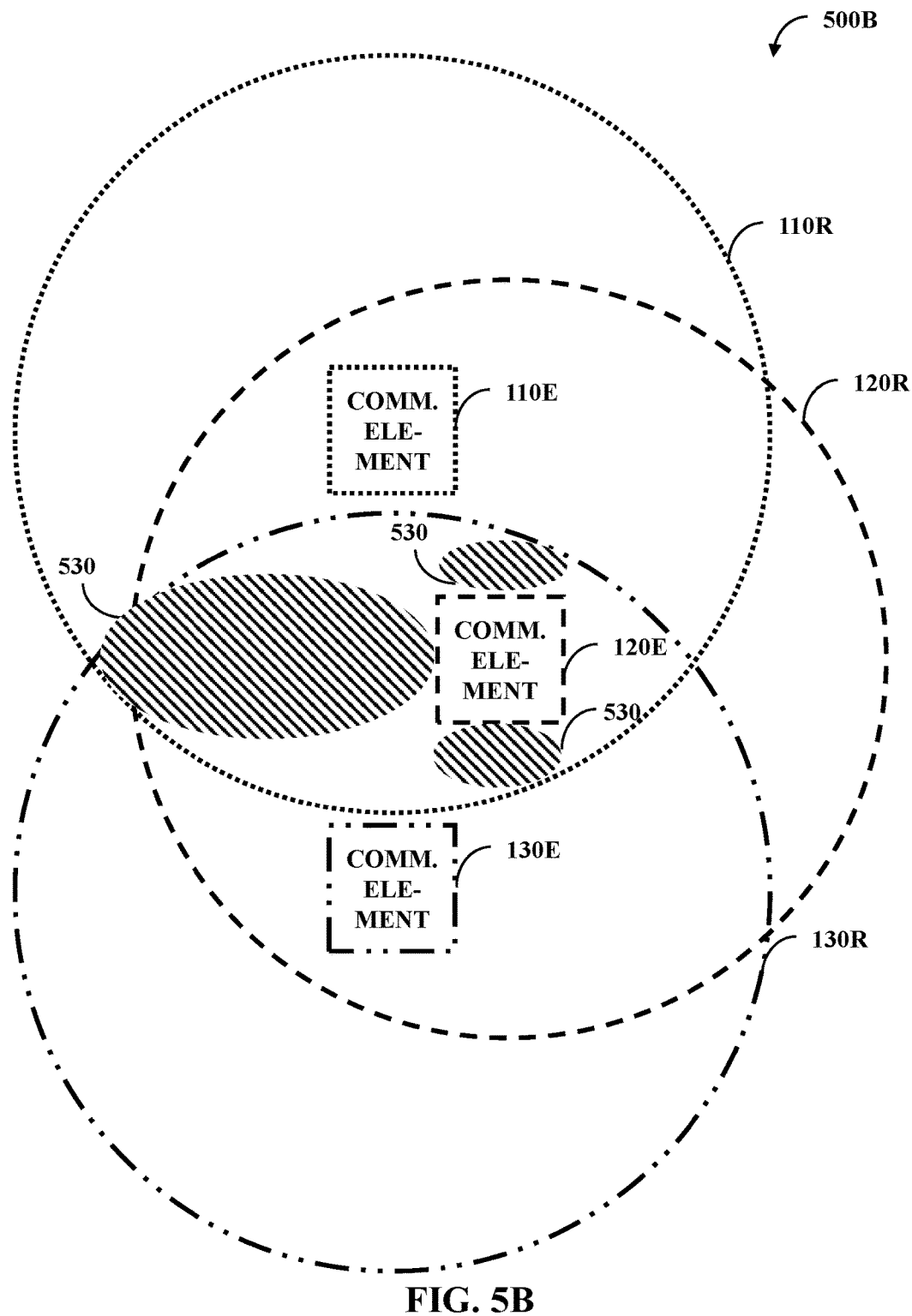
FIG. 5B illustrates one embodiment of a communications environment with a movable area.

FIG. 5A illustrates one embodiment of a system 500A comprising the determination component 140, the visualization component 150, a reliance component 510, and a dependency component 520 while FIG. 5B illustrates one embodiment of a communications environment 500B with a movable area 530. The reliance component 510 can be configured to make a determination of a reliance the element 110E has on the element 120E with regard to communication (e.g., the element 110E relies on the element 120E to be able to communicate with the element 130E). The dependency component 520 can be configured to make a determination of a movable area 530 for the element 120E in view of this reliance. The element 120E can be provided information about the movable area (e.g., can be depicted in its visualization 160).

In one example, a mining accident can occur where a rescue team needs to go into a dangerous mine. The members of the rescue team can retain the elements 110E-130E as radios, but radio communication can be very limited. As the team goes down the mine, individuals can stop their decent to reinforce areas or to create a communication chain. In this example, element 130E can be considered an above-ground base station. Four rescue team members can be paired in groups of two: one group with element 110E and one group with element 120E (e.g., each element comprising a primary radio for one pair member and a back-up radio for the other pair member). Elements 110E and 120E can go half way down the mine that extends toward an end of the range 130R for the element 130E. At this point, element 120E can stop and element 110E can continue down the mine outside of the range 130E, but still inside the range of 120E. This can allow for element 110E to keep in communication with element 130E by way of element 120E acting as a relay. However, if element 120E were to move outside of the range of 110R or the range 130R, then communication between element 110E and element 130E would be lost outside of another available communication medium. Therefore, the operation can be dependent on element 120E staying in a certain location. This location (the movable area) can be determined by the dependency component 520 and be illustrated in the visualization 500B (e.g., other information can go into the illustration, such as not highlighting impassable or dangerous areas).

Other information can be presented on the visualization. In one example, communication with the element 110E can be lost. With this situation, the visualization 500B (e.g., a visualization presented on a display of the element 120E) can illustrate a last known location of element 110E as well as directions to the last known location of element 110E while keeping in contact with element 130E (e.g., facilitated by way of the system 600A discussed below).

Figure 6A:
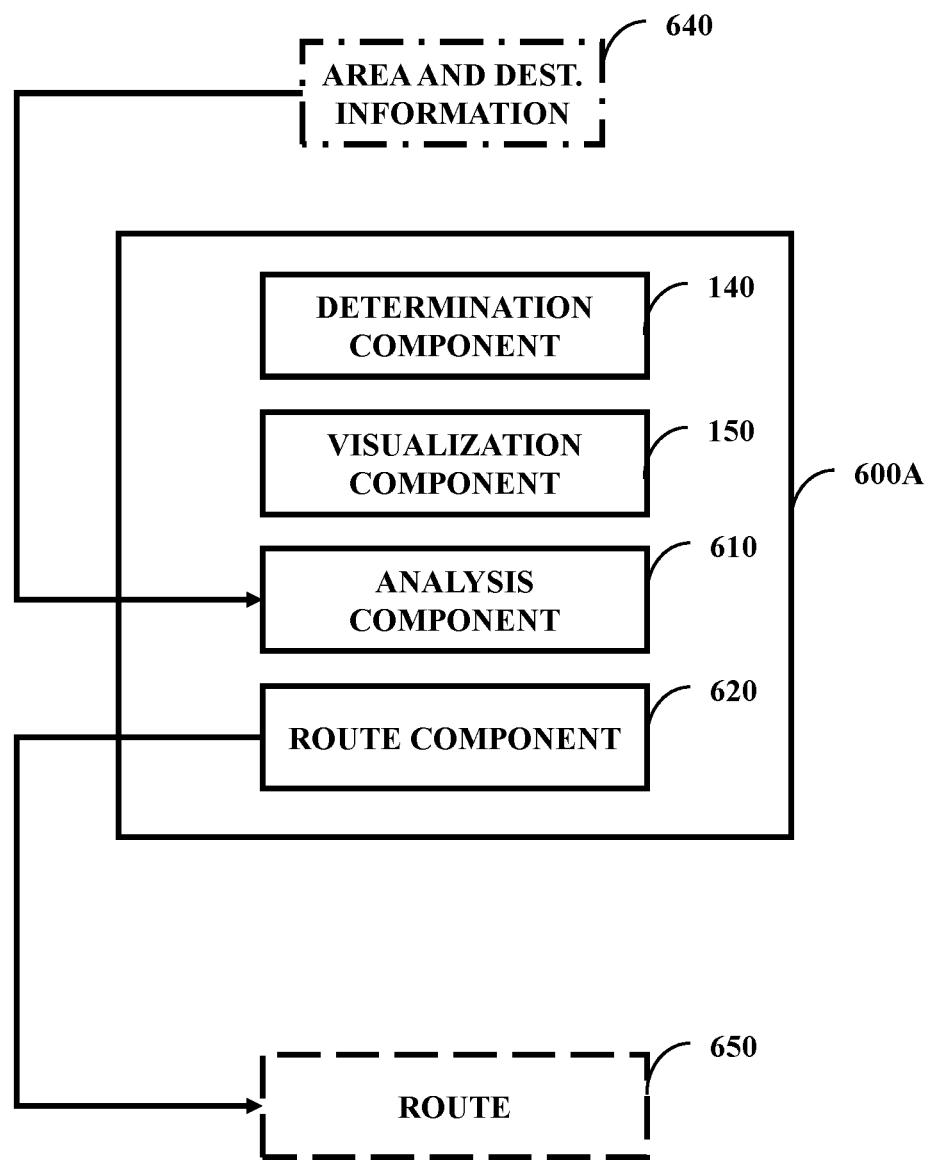
Figure 6B:
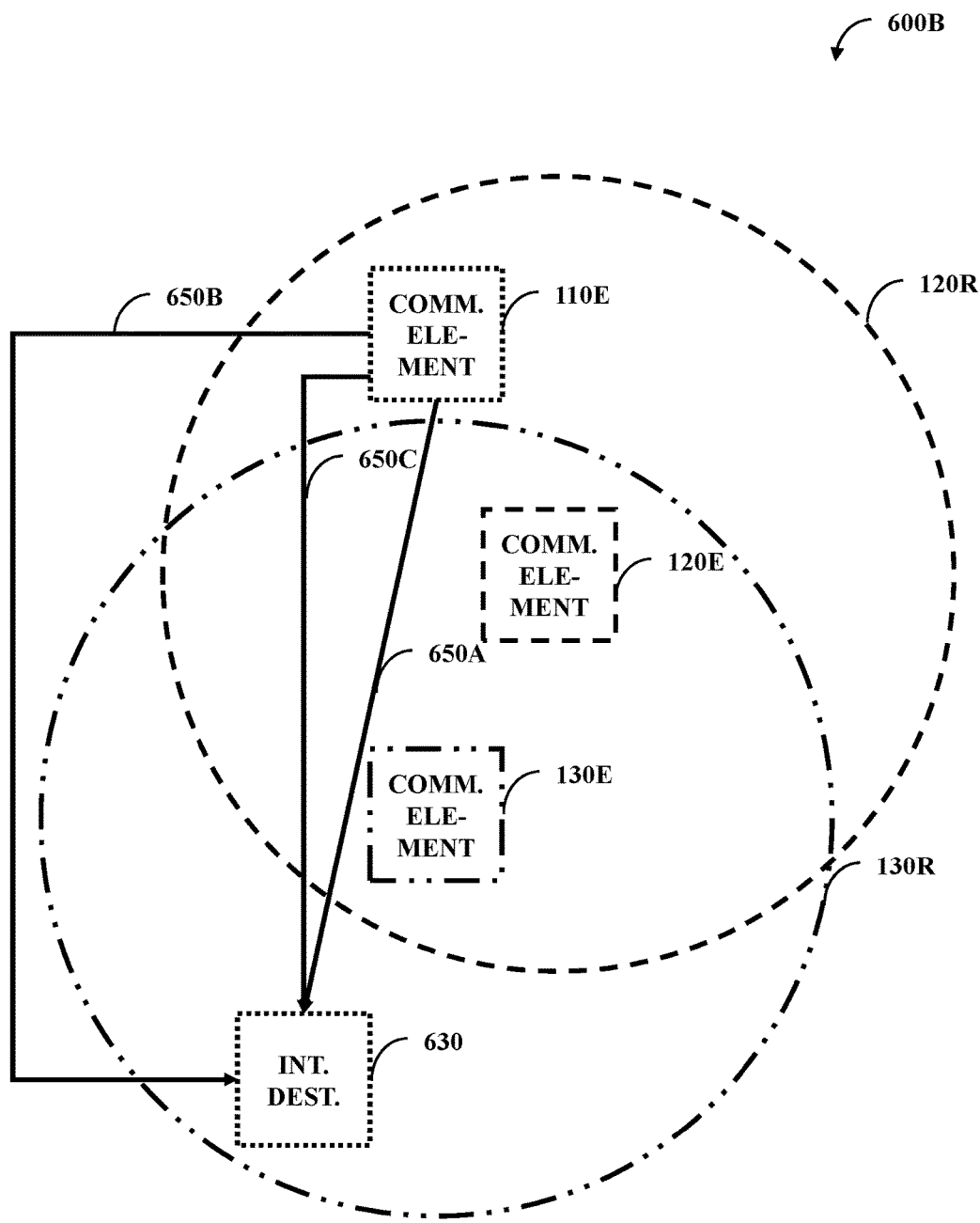
FIG. 6B illustrates one embodiment of a communications environment with multiple routes and FIG. 6C illustrates one embodiment of the route component.
Figure 6C:
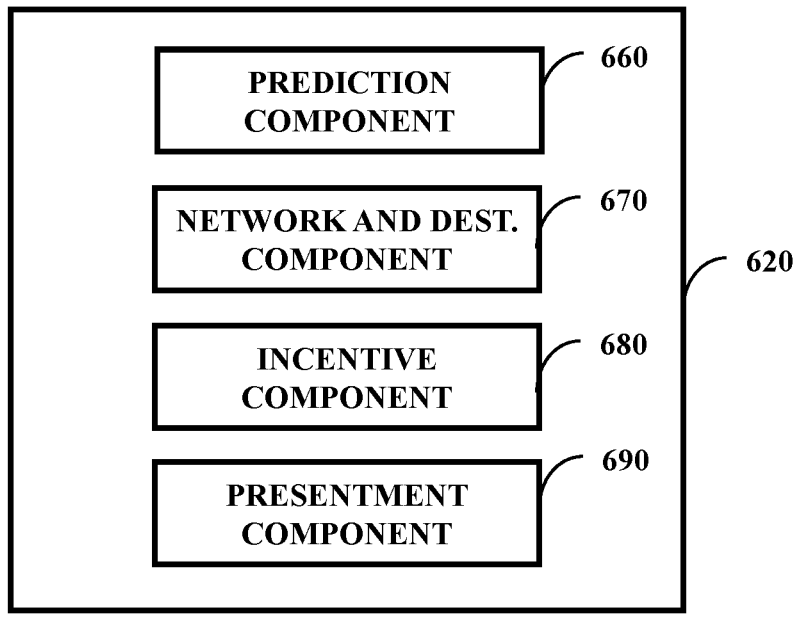

FIG. 6A illustrates one embodiment of a system 600A comprising the determination component 140, the visualization component 150, an analysis component 610, and a route component 620, FIG. 6B illustrates one embodiment of a communications environment 600B with multiple routes 650A-650C, and FIG. 6C illustrates one embodiment of the route component 620. The analysis component 610 can be configured to analyze the communication area and an intended destination 630 of the element 110E (e.g., derived from area and destination information 640) to produce an analysis result. The route component 620 can be configured to create a route 650 for the element 110E based, at least in part, on the analysis result.

The route 650 can be such that the element 110E is kept within the communication area (e.g., at all times or to a maximum extent possible). In one example, the route component 620 can create multiple routes available to a user of element 110E. These multiple routes (e.g., routes 650A-650C) can be presented to the user on the visualization 600B or be calculated absent presentation. Various factors can be analyzed to determine which route the user should take (e.g., selected by the user from the multiple routes or selected for the user without presenting options). Examples can include a shortest route, a route that does not exit the communication area, a route beneficial to element 120E and/or element 130E, etc.

The route component 620 can use various factors in route determination and/or route selection. The route component 620 can use a metric, such as a geometric mean, to rate the routes 650A-650C. In one embodiment, a number of variables can be used to rate each route 650A-650C such as distance and safety (e.g., defined as number of coalition troops along an individual route). In one example, distance in number of miles can range from one to five and safety can range from 0% to 90%. A number of coalition troops along each route 650A-650C can range from 27 to 62. The geometric mean can be the $3^{rd}$ root of the product of the values assigned to each of the variables. If the value of any variable increases by 50% (e.g., more troops arrive upon a route), the geometric mean would increase by about 15%. The route that gets the highest geometric mean would be the best and the route component 620 can select the route with the highest geometric mean for use. As a change occurs (e.g., more troops arrive upon a non-selected route), the route component 620 can determine if the selected route should be modified (e.g., based, at least in part, on how far along the route a user has traveled).

In one embodiment, the route component can employ a prediction component 660 configured to make a prediction regarding movement of the communication area provided by the communication partner group the element 110E and the route 650 can be created based, at least in part, on this prediction. In one example, the elements 110E-130E reside on automobiles. As the vehicles drive along the road, the elements 110E-130E and in turn the ranges 120R and 130R (as well as 110R of FIG. 1) move. A route can be continuously updated by the route component 620 or the route component 620 can predict where the elements 120E and 130E (for element 110E) will travel and create a route 650 that at the time may take the element 110E out of the coverage area, but is predicted to keep the element 110E in the coverage area as the elements 120E and 130E move.

In one embodiment, the route component 620 can employ a network component and a destination component depicted as a joint network and destination component 670. The network component can be configured to make a determination on a desired network coverage area for a network of which the element 110E is part. The destination component can be configured to make a selection of the intended destination 630 for the element 110E, where the selection is based, at least in part, on the desired network coverage area.

With this, central management for the network can take place. A central governing body can dictate where elements should travel. Additionally, an ad hoc element determination can take place on where elements should travel absent central management.

In one embodiment, the distribution element 250 of FIG. 2 chooses the desired network coverage area and intended destination 630. Desired network coverage area information and intended destination information can be communicated to the element 110E, upon which the route component 620 resides. The route component 620 can receive this information, the network component can process the information to determine the area, and the destination component can process the information to learn the selection (e.g., learning of the selection can be considered as being encompassed by making the selection).

In one embodiment, the element 110E (or a user of the element 110E) can be incentivized to take a certain route 650 and/or arrive at the intended destination 630. In a military context, an incentive can simply be to follow an order and not be subject to discipline for not following such an order. However, in a commercial environment, different incentives can be provided for different purposes.

In one embodiment, the incentive component 680 is configured to make a determination on an incentive to incentivize the element 110E to move to the intended destination 630 and/or to travel along a particular route (e.g., travel along route 650B as opposed to route 650A). The presentment component 690 can be configured to present the incentive to the communication element. This incentive can be presented by way of the display 110Z of FIG. 1.

In one example, a wireless management company can try to create a network where an entire area has wireless coverage. To achieve this, elements should be strategically placed so that linkage among elements can occur. Incentives can be used to facilitate this strategic placement.

With one scenario, the wireless management company can attempt to have wireless coverage on an interstate highway (e.g., speed limit 65 miles per hour), for example route 650A, as well as on a state route (e.g., speed limit 40 miles per hour), for example route 650C. This wireless coverage can be facilitated by the elements 110E-130E being vehicles or residing on vehicles. Management of wireless coverage can be challenging since the vehicles are moving at high speeds, vehicles enter and exit these roads at various times and places, there may be a preference for drivers to take the faster road, and other reasons. Therefore, the incentive component 680 can determine what incentives to provide what drives to have them travel on one road over another or a speed to travel at to make sure elements are spread out. What incentive is selected (e.g., cash, credit, coupon, service such as no charge satellite radio, etc.), when it is presented, the value of the incentive, etc. can be based on various situational factors such as anticipated needs of a drive (e.g., driving to work against a leisure drive), time of day, personal situation (e.g., prefers shopping at 'store X' over 'store Y', so coupon for 'store X' is provided), etc. In addition, the wireless management company can leverage incentives against one another for different elements, such as offer elements 110E-130E to take the state route and the first element to accept and/or follow-through is given the incentive while the other elements have the incentive retracted.

In a different scenario, the wireless management company can have a desire to have wireless coverage in a downtown area during a period of time, such as during working hours. To achieve this, the element 110A can be strategically placed at a specific time in order to achieve this wireless coverage. In this example, the incentive component 680 can determine that a beneficial location for the element 110E, with regard to improving (e.g., maximizing) coverage area, is a particular coffee shop. The presentment component 690 can present an incentive that if a user of element 110A enters the coffee shop, they will receive a coupon to the coffee shop for $X and if they stay for two hours they will receive a coupon for $Y, with X and Y being positive, non-zero integers.

Along with incentivizing the destination, different routes can be incentivized and/or be presented with metadata that could be considered an incentive. In one example, the route component 620 creates the routes 650A-650C and these routes are presented to a user of the element 110E by way of the display 110Z of FIG. 1. By way of the display 110Z of FIG. 1 or through another manner, the user can select a route to use and this route is received by the system 600. The selected route can be presented on the display 110Z (e.g., if route 650C is selected, the routes 650A and 650B are removed from the visualization 600B).

In one example, the routes themselves are not presented to the user, but instead metadata about the routes is presented. In this example two routes can be presented to the user: a first route (e.g., route 650A) and a second route (e.g., route 650B). A chart can be presented to the user, by way of the presentment component 690 and the display 110Z of FIG. 1, with metadata regarding the routes. In this example, the first route can have an estimated travel time of 2 hours and an estimated time in a network at 60% while the second route can have an estimated travel time of 2.5 hours and an estimated time in a network at 90%. This way, the user can select if he or she would prefer to arrive faster or have more coverage (e.g., more in-network coverage). In one embodiment, the geometric mean could be used to rate the two routes and these means could be provided to the user for convenient comparison.

Figure 7:
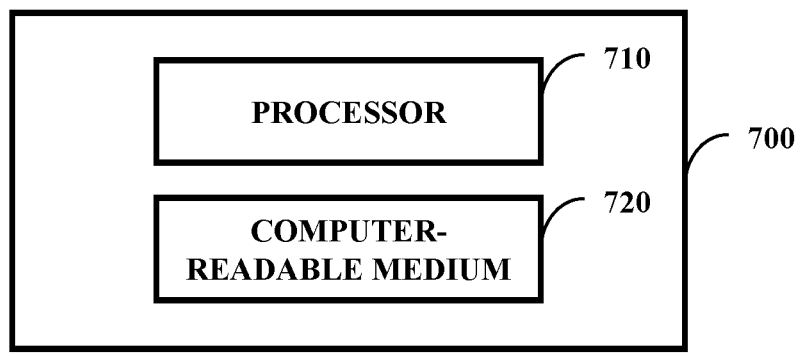
FIG. 7 illustrates one embodiment of a system comprising a processor and a computer-readable medium.

FIG. 7 illustrates one embodiment of a system 700 comprising a processor 710 (e.g., a general purpose processor or a processor specifically designed for performing a functionality disclosed herein) and a computer-readable medium 720 (e.g., non-transitory computer-readable medium). In one embodiment, the computer-readable medium 720 is communicatively coupled to the processor 710 and stores a command set executable by the processor 710 to facilitate operation of at least one component disclosed herein (e.g., the determination component 140 of FIG. 1, the visualization component 150 of FIG. 1, etc.). In one embodiment, at least one component disclosed herein (e.g., the determination component 140 of FIG. 1, the visualization component 150 of FIG. 1, etc.) can be implemented, at least in part, by way of non-software, such as implemented as hardware by way of the system 700. In one embodiment, the processor 710 and/or the computer-readable medium 720 reside on the element 110E of FIG. 1 (e.g., at least one component disclosed herein resides on the element 110E). In one embodiment, the computer-readable medium 720 is configured to store processor-executable instructions that when executed by the processor 710, cause the processor 710 to perform a method disclosed herein (e.g., the methods 800-1100 addressed below).

Figure 8:
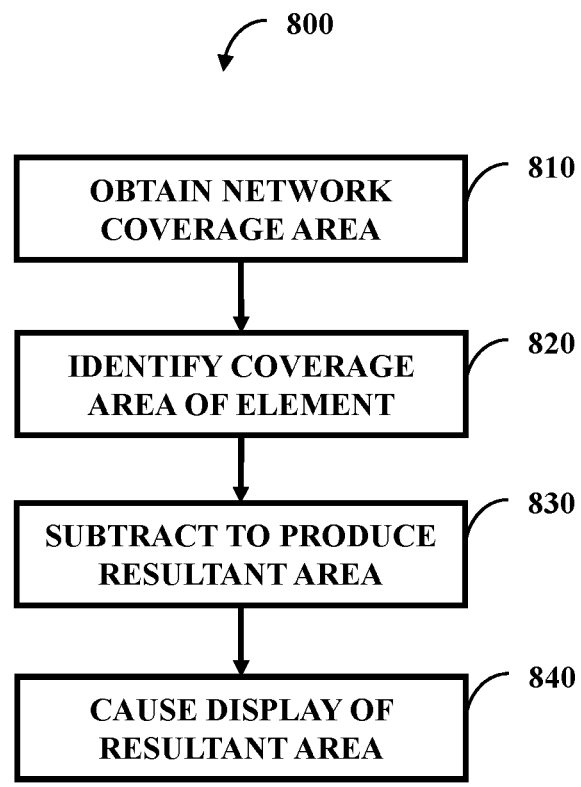
FIG. 8 illustrates one embodiment of a method comprising four actions.

FIG. 8 illustrates one embodiment of a method 800 comprising four actions 810-840. At 810, obtaining a coverage area (e.g., ranges 110R-130R of FIG. 1) for a network comprising a mobile communication element (e.g., element 110A of FIG. 1) occurs (e.g., obtaining a collection of indexed coverage areas for individual nodes of the network). At 820, identifying a coverage area (e.g., range 110R of FIG. 1) of the mobile communication element takes place. At 830, subtracting the coverage area of the mobile communication element from the coverage area of the network occurs to produce a resultant area (e.g., ranges 120R and 130R). As an example of this subtracting, using an the collection of indexed coverage areas can occur by summing coverage areas of nodes of the network but the mobile communication element and therefore subtraction by lack of addition. At 840, there is causing information related to the resultant area to be presented (e.g., presented on the display 110Z of FIG. 1).

In one example, the method 800 can be performed by the element 110E of FIG. 1. The element 110E of FIG. 1 can obtain the coverage area (e.g., locational information of the coverage area, such as what coordinates are covered by the coverage area) from a remote location (e.g., a user of the element 110E of FIG. 1 would not be from a remote location), such as the distribution element 250 of FIG. 2. The element 110E of FIG. 1 can subtract its own range 110R of FIG. 1 and cause the result to be presented.

Various forms of presentment for the resultant area can take place. In one example, information related to the resultant area is presented on the display 110Z of FIG. 1, such as by way of the visualization 160A of FIG. 1. The visualization 160A, or the resultant area portion of the visualization 160A, can be in a single base color, such as green. With this, different metadata can be presented with the visualization 160A of FIG. 1. Examples of metadata can include network-based metadata (e.g., a darker shade of green for when the resultant area's signal strength is stronger, such as above a threshold, and lighter shade of green for when the resultant area's signal strength is weaker, such as at or below a threshold), element-based metadata (e.g., coordinates of the elements 110E-130E of FIG. 1), situational metadata (e.g., display messages sent from others), etc. Signal strength in the visualization may represented as shades of green as mentioned; however, in one embodiment, signal strength can be represented in the colors of the spectrum, with areas having a highest signal strength colored in red, and areas having a lowest signal strength colored in blue or violet. In one embodiment, areas with signal strength below a threshold can be colored green, blue, and violet, while areas with signal strength above or meeting the threshold can be colored red, yellow and orange.

In another example of presentment, a user of element 110E of FIG. 1 uses a headset. In this example, when the user is physically within the resultant area, no sound can be made. However, as the user nears the physical border of the resultant area, a tone can be played as the presentment and once the user exits the area, the tone can be played louder and/or faster.

Figure 9:
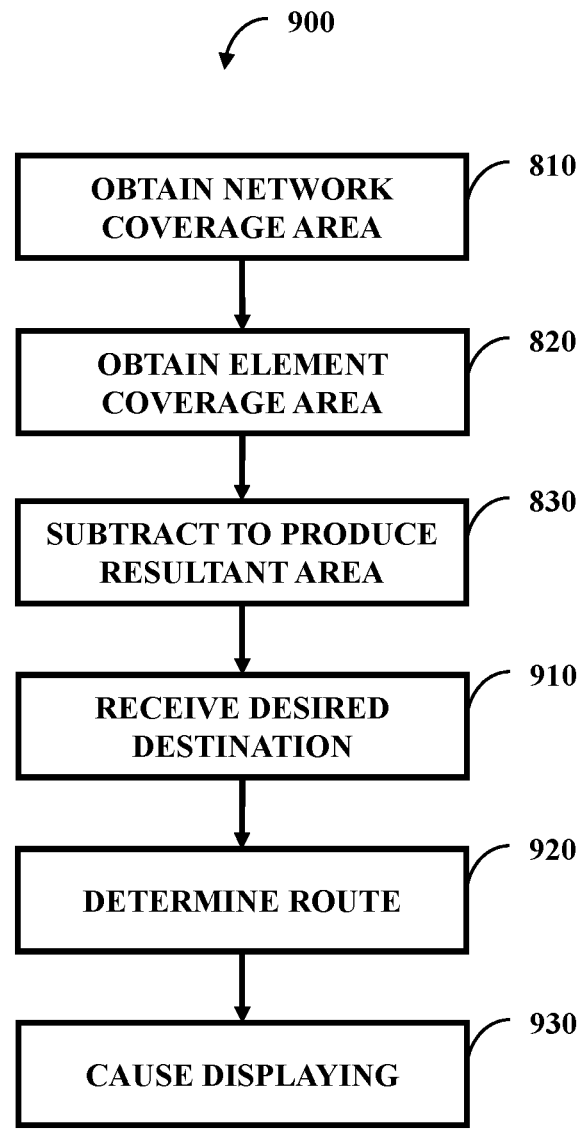
FIG. 9 illustrates one embodiment of a method comprising six actions.

FIG. 9 illustrates one embodiment of a method 900 comprising six actions 810-830 and 910-930. Actions 810-830 can occur and, at 910, receiving a desired destination (e.g., the intended destination 630 of FIG. 6) for the element 110E of FIG. 6 can take place. In one example, the desired destination can be received from outside the element 110E of FIG. 6, such as sent from the distribution element 250 of FIG. 2. At 920, there can be determining a route that causes the element 110E of FIG. 1 to remain in the coverage area while reaching the desired destination (e.g., route 650C of FIG. 6) and at 930, the route can be displayed upon the display 110Z of FIG. 1 as the presentment.

In one embodiment, the route can be determined through prediction (e.g., employment of the prediction component 660 of FIG. 6 and practice of at least one artificial intelligence technique). This can be prediction of movement of the element 120E and/or 130E of FIG. 1. This prediction can include a lack of movement (e.g., that the element 120E of FIG. 6 will remain stationary while the element 110E of FIG. 6 travels along the route 650C of FIG. 6 to the intended destination 630 of FIG. 6). In one example, the prediction can be on how other elements are anticipated to respond to the change in coverage area brought on by movement of the element 110E of FIG. 6 and therefore the impact on their individual resultant areas (e.g., when the network has more than two elements).

As the element 110E of FIG. 6 follows the route and travels to the desired destination, the coverage area can change. To ensure that other elements of the network (e.g., elements 120E and 130E of FIG. 1) have correct information (e.g., a correct visualization 160 of FIG. 1), information can be communicated from the element 110E of FIG. 2 to the distribution element 250 of FIG. 2. The distribution element 250 of FIG. 2 can update the coverage area and distribute the updated coverage area to the elements 120E-130E of FIG. 2 (e.g., as well as distributed the updated coverage area to element 110E of FIG. 2). With this, other elements can update their visualizations, update their routes (e.g., if they are dependent on coverage of element 110E of FIG. 1 for their route), etc.

Figure 10:
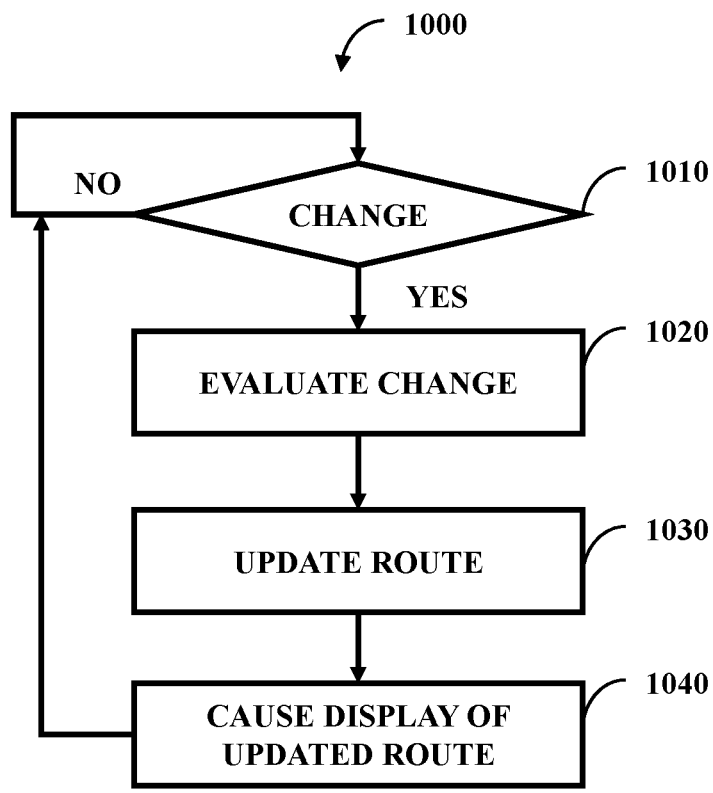
FIG. 10 illustrates one embodiment of a method comprising a check and three actions.

FIG. 10 illustrates one embodiment of a method 1000 comprising a check 1010 and three actions 1020-1040. With the check 1010, identifying a change in the coverage area that is different from a change derived from movement of the element 110E of FIG. 6 takes place. As an example, the change can be movement of the element 120E of FIG. 6. At 1020, there can be evaluating the change in the coverage area to produce an evaluation result. At 1030, there can be updating the route to an updated route through use of the evaluation result, at 1040, causing the updated route to be displayed upon the display 110Z of FIG. 1 can take place, and the method can return to checking for a different change.

While shown as a direct action between 1020 and 1030, a check can take place if the change is significant or relevant. A slight movement of the element 130E may not be significant enough to merit a change in the route or even the visualization 600B of FIG. 6. Similarly, a movement complementary to movement of the element 110E may not cause a change in the route 650. As an example, element 120E may also be travelling to the intended destination 630 of FIG. 6. Since the movement of the element 120E of FIG. 6 can be in a same general direction as movement of the element 110E of FIG. 6, the element 110E of FIG. 6 can continue to be in network and therefore have coverage. In view of this, the route 650 will not change.

Figure 11:
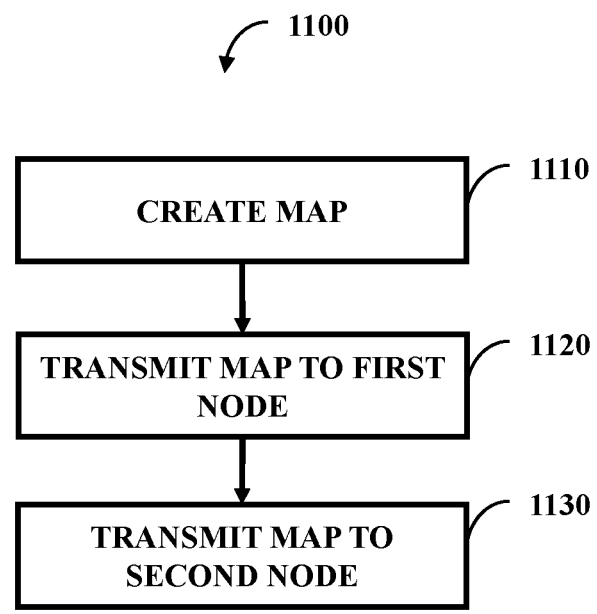
FIG. 11 illustrates one embodiment of a method comprising three actions.

FIG. 11 illustrates one embodiment of a method 1100 comprising three actions 1110-1130. The actions 1110-1130 can be performed, at least in part, by the distribution element 250 of FIG. 2. At 1110, creating a coverage map for a network comprising a first mobile network node (e.g., element 110E of FIG. 2) and a second mobile network node (e.g., element 120E of FIG. 2) can occur. At 1120, there can be transmitting the coverage map to the first mobile network node and, at 1130, there can be transmitting the coverage map to the second mobile network node. The nodes can create mobile centric maps and cause these maps to be displayed.

Nodes can function independently of a type of antenna used and/or type of communication device employed. In one example, the first node can be a radio that is mounted on a vehicle and that uses a dipole antenna. With this example, the second node can be a communication device carried by a soldier with a patch antenna.

In addition, element-to-element communication can function as a back-up to a larger system. In one example, element communication can be handled by a satellite system. With this, elements 110E-130E of FIG. 1 communicate with one another by way of a satellite that the elements are in communication with. The element-to-element communication can be used when the satellite system experiences a failure.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
a determination component configured to make a determination on an available communication area for a communication element provided by a communication partner group of the communication element;
a visualization component configured to produce a visualization that illustrates the available communication area;
an analysis component configured to analyze the communication area and an intended destination of the communication element to produce an analysis result; and
a route component configured to select a route for the communication element based, at least in part, on the analysis result,
where the visualization and the selected route are configured for presentation upon a display,
where the selected route, for at least a part of a session, is presented absent presentation of a second route such that one route, the selected route, is presented, and
where the determination component, the visualization component, the analysis component, the route component, or a combination thereof are implemented, at least in part, by way of non-software.

2. The system of claim 1, comprising:
a coverage component configured to identify an overall communication area of the communication partner group; and
an element component configured to determine a communication area of the communication element,
where the determination component makes the determination by ignoring the communication area of the communication element from the overall communication area.

3. The system of claim 1, comprising:
a change component configured to identify a change to the communication partner group of the communication element; and
an update component configured to update the visualization to reflect the change.

4. The system of claim 3, where the change is a net change in a total number of the communication partner group.

5. The system of claim 1,
where the display is a first display,
where the visualization is a first visualization,
where the communication element is a first communication element,
where the communication partner group comprises a second communication element,
where the first communication element is a communication partner to the second communication element,
where a determination is made on an available communication area for the second communication element based, at least in part, on a communication area provided by a communication partner group of the second communication element,
where a second visualization is configured for presentation upon a second display,
where the first visualization is centric to the first communication element such that the first visualization does not illustrate an offering of the first communication element, and
where the second visualization is centric to the second communication element such that the second visualization does not illustrate an offering of the second communication element.

6. The system of claim 5, comprising:
a gap component configured to identify a gap in the available communication area for the first communication element;
a location component configured to make a determination of a location for the second communication element to mitigate the gap; and
an instruction component configured to create an instruction that is disclosed to the second communication element,
where the instruction is to move to the location.

7. The system of claim 5, comprising:
a reliance component configured to make a determination of a reliance the first communication element has on the second communication element with regard to communication; and
a dependency component configured to make a determination of a movable area for the second communication element in view of this reliance,
where information on the movable area is presented upon the second display.

8. The system of claim 1, comprising:
a prediction component configured to make a prediction regarding movement of the communication area provided by the communication partner group of the communication element,
where the route component is configured to select a route for the communication element based, at least in part, on the prediction.

9. The system of claim 1, comprising:
a network component configured to make a determination on a desired network coverage area for a network of which the communication element is part; and
a destination component configured to make a selection of the intended destination for the communication element,
where the selection is based, at least in part, on the desired network coverage area.

10. The system of claim 9, comprising:
an incentive component configured to make a determination on an incentive to incentivize the communication element to move to the intended destination; and a presentment component configured to present the incentive to the communication element.

11. The system of claim 10, where the display is a heads-up display.

12. The system of claim 1, comprising:
a reception component configured to receive an override instruction,
where the route is a first route for the communication element,
where the route component is configured to determine a second route for the communication element based, at least in part, on the analysis result,
where a first route indicator and a second route indicator are presented,
where the override instruction is to select the second route instead of the first route, and
where the second route is designated as a route for travel on the display.

13. The system of claim 1, comprising:
an availability component configured to determine if a route that causes the communication element to remain in the available communication area while reaching the intended destination is not available;
a location component configured to, when the route is not available, determine a location for a second communication element, that is different from the communication element, that causes the route to be available;
where, when the route is available, the route component selects the route that causes the communication element to remain in the coverage area while reaching the intended destination as the route for the communication element and
where the second communication element is part of the communication partner group at least when the route component makes the selection.

14. A method, performed at least in part by a centralized network node, comprising:
creating a coverage map for a network, the network comprising a first mobile network node and a second mobile network node;
transmitting the coverage map to the first mobile network node; and
transmitting the coverage map to the second mobile network node,
where the first mobile network node creates a first mobile network node centric map based, at least in part, on the coverage map,
where the second mobile network node creates a second mobile network node centric map based, at least in part, on the coverage map,
where the first mobile network node centric map is displayed on a first display associated with the first mobile network node,
where the second mobile network node centric map is displayed on a second display associated with the second mobile network node,
where the first mobile network node centric map does not disclose a coverage area of the first mobile network node,
where the second mobile network node centric map does not disclose a coverage area of the second mobile network node, and
where the first mobile network node and the second mobile network node are configured to communicate with one another.

15. The method of claim 14,
where the first mobile network node creates the first mobile network node centric map by removing a contribution of the coverage area of the first mobile network node from the coverage map and
where the second mobile network node creates the second mobile network node centric map by removing a contribution of the coverage area of the second mobile network node from the coverage map.

* * * * *